United States Patent
Frost

(10) Patent No.: US 7,162,787 B2
(45) Date of Patent: Jan. 16, 2007

(54) METHOD FOR CONSTRUCTING A HONEYCOMB EXTRUSION DIE

(75) Inventor: Rodney I. Frost, Corning, NY (US)

(73) Assignee: Corning Incorporated, Corning, NY (US)

(*) Notice: Subject to any disclaimer, the term of this patent is extended or adjusted under 35 U.S.C. 154(b) by 364 days.

(21) Appl. No.: 10/819,506

(22) Filed: Apr. 6, 2004

(65) Prior Publication Data

US 2005/0139641 A1    Jun. 30, 2005

(51) Int. Cl.
- B29C 47/30    (2006.01)
- B29C 47/12    (2006.01)
- B23P 17/00    (2006.01)

(52) U.S. Cl. ............... 29/428; 29/525.14; 264/177.12; 425/463; 425/467

(58) Field of Classification Search ............... 29/428, 29/525.13, 525.14, 527.1, 890; 264/177.12, 264/209.1; 425/463, 464, 467
See application file for complete search history.

(56) References Cited

U.S. PATENT DOCUMENTS

| | | | |
|---|---|---|---|
| 3,790,654 A | 2/1974 | Bagley | 264/177 |
| 4,041,597 A | 8/1977 | Folmar et al. | 29/423 |
| 4,465,652 A | 8/1984 | Lentz | 264/177 R |
| 4,468,366 A | 8/1984 | Socha, Jr. | 264/177 R |
| 4,846,657 A * | 7/1989 | Chao | 425/190 |
| 4,902,216 A | 2/1990 | Cunningham et al. | 425/463 |
| 4,983,423 A | 1/1991 | Goldsmith | 427/230 |
| 5,066,215 A | 11/1991 | Peters et al. | 425/464 |
| 5,238,386 A | 8/1993 | Cunningham et al. | 425/192 R |
| RE34,624 E * | 5/1994 | Cunningham | 425/461 |
| 5,308,556 A | 5/1994 | Bagley | 264/13 |
| 5,807,590 A * | 9/1998 | Ishikawa et al. | 425/190 |
| 5,964,020 A * | 10/1999 | Kragle et al. | 29/423 |
| 6,080,348 A * | 6/2000 | Shalkey | 264/177.12 |
| 6,343,923 B1 * | 2/2002 | Cunningham et al. | 425/190 |

* cited by examiner

*Primary Examiner*—Jermie E. Cozart
(74) *Attorney, Agent, or Firm*—Kees van der Sterre; Robert L. Carlson

(57) ABSTRACT

A honeycomb extrusion die includes an inlet face having a plurality of feed channels, and a discharge face having an array of intersecting honeycomb discharge slots. The extrusion die also includes a bonded array of pin elements each exposed on the discharge face of the die and juxtaposed to form the discharge slots of the discharge face and the array of feed channels, wherein the discharge slots extend from the feed channels, and wherein the feed channels communicate with the discharge slots so as to guide an extrudable material toward the discharge face. Each pin element includes a plurality of discharge slot surfaces, a plurality of feed channel surfaces continuous with the discharge slot surfaces for guiding the extrudable material toward the discharge face, and a plurality of spacing surfaces for spacing each pin element from adjacent pin elements.

6 Claims, 6 Drawing Sheets

METHOD FOR CONSTRUCTING A HONEYCOMB EXTRUSION DIE

BACKGROUND OF THE INVENTION

This invention relates to the construction of an extrusion die for extruding flowable materials into a honeycomb structure for use in an automotive catalytic converter and other honeycomb structures, such as particulate traps for diesel engines.

Extrusion dies have been found to be useful in forming cellular or honeycomb ceramic substrates for use as catalytic converters utilized in the exhaust system of internal combustion engines or particulate traps for diesel engines. In order for such converters to function efficiently, it is necessary that the cells provide a substantially large surface area for catalytic material to react with the exhaust gases, and that the cell walls have a substantially thin cross-sectional dimension so as to provide a substantially large open frontal area, thereby reducing back pressure within the entire exhaust system. However, the thin-walled structure must simultaneously exhibit sufficient mechanical and thermal integrity so as to withstand normal automotive impact and thermal requirements.

These honeycomb structures typically have transverse cross-sectional cellular densities of approximately fifty (50) to one hundred fifty (150) cells or more per square centimeter. The reference numeral 10 (FIG. 1) generally designates a catalyst support body subsequent to extrusion and that is generally well known and that includes a honeycomb structure 12 formed by a matrix of intersecting, thin, porous walls 14 surrounded by an outer wall 16, which in the illustrated example is provided in a circular cross-sectional configuration. The walls 14 extend across and between a first end face 18 and an opposing second end face 20, and form a large number of adjoining hollow passages or cells 22 which also extend between and are open on the end faces 18, 20 of the filter body 10. After being coated with a catalyst, honeycomb structure 12 may be used in an automotive catalytic converter. In the formation of a particulate trap 11 (shown in FIGS. 2 and 3), one end of each of the cells 22 is sealed, a first subset 24 of the cells 22 being sealed at the first end face 18, and a second subset 26 of the cells 22 being sealed at the second end face 20 of the filter 11. Either of the end faces 18, 20 may be used as the inlet face of the resulting filter 11.

Extrusion dies of various configurations have been utilized to produce these honeycomb structures, including those which are disclosed in Yamamoto, U.S. Pat. No. 4,354,820; Reed, U.S. Pat. No. 4,235,583; and, Bagley, U.S. Pat. No. 3,905,743.

A significant drawback of certain prior art extrusion dies may be seen by reference to FIG. 1 of each of the Yamamoto and Reed patents. In both of these structures, the inlet portion of the die is provided with a plurality of cylindrical feed holes having downstream ends that terminate at the entrance or upstream portions of respective intersecting discharge slots, with alternate diagonal intersections of the discharge slots being directly fed by and aligned with the feed holes in the die. As disclosed by Yamamoto, the material being extruded enters into the feed holes each denoted by the numeral 2. The lower end of each of the feed holes is interrupted by tapered portions indicated by the numeral 20 in FIG. 3. After passing beyond the flow constriction, the extruded material flows into the outlet or discharge end of the die, for final extrusion through the discharge slots. As a result of the configuration disclosed by Yamamoto, there is an abrupt change in the cross-sectional area and shape of flow at the lower ends of the cylindrical feed holes, such change caused by the tapered portions 20. Within Reed, a somewhat similar construction is shown wherein the exit portions of cylindrical feed holes 7 are abruptly narrowed down at the entrance to the discharge slots, the latter being denoted by the numeral 9.

The extrusion dies as disclosed by Yamamoto and Reed each include four over-hanging, flow constricting portions at the outlet end of each feed hole, resulting in an abrupt decrease in the cross-sectional area of the feed holes. As a result, the die is subjected to a high stress due to the back pressure which develops from the extruded material abutting or flowing against each area overhanging the feed holes. In turn, this requires either the use of die materials having greater strength, or results in a limitation to the feed hole density of dies formed from materials having the greatest strength. Moreover, in the event that the material being extruded contains abrasive material, dies configured in such a manner are subject to greater wear and hence increased die degradation.

Other configurations of extrusion dies include monolithic billet dies, such as shown in FIGS. 1–6 of Bagley, wherein the die is formed in a unitary die block by utilizing conventional machining and cutting techniques, electric discharge machining, or electrochemical machining. Generally, unitary die blocks are formed of metals that not only facilitate ease of machining, but also provide a degree of elasticity to accommodate stresses and bending moments generated centrally of the discharge face during the application of high extrusion pressures.

As further disclosed in FIGS. 7, 8 and 9 of the Bagley patent, extrusion dies for honeycomb ceramic substrates may also be formed from a plurality of elongated extrusion plates which are clamped together in a stacked condition to form a laminated extrusion die. A major advantage of this configuration is the fact that each plate may be formed of an extremely hard wear-resistant material. However, like all of the other techniques disclosed above, such a configuration requires precise machining of slots and drilling of small holes to make such configuration. As a result of the complex machining required, such configurations have not yet been commercialized.

SUMMARY OF THE INVENTION

One aspect of the present invention is to provide a honeycomb extrusion die that includes an inlet face having a plurality of feed channels, and a discharge face having an array of intersecting honeycomb discharge slots. The honeycomb extrusion die also includes a bonded array of pin elements each exposed on the discharge face of the die and juxtaposed to form the discharge slots of the discharge face and the array of feed channels, wherein the discharge slots extend from the feed channels, and wherein the feed channels communicate with the discharge slots so as to guide an extrudable material toward the discharge face. Each pin element includes a plurality of discharge slot surfaces, a plurality of feed channel surfaces continuous with the discharge slot surfaces for guiding the extrudable material toward the discharge face, and surfaces which cooperate with surfaces on adjacent pin elements to form the feed channels.

Another aspect of the present invention is to provide a method for constructing a honeycomb extrusion die including forming a plurality of pin elements, wherein each pin element includes a plurality of discharge slot surfaces, a plurality of feed channel surfaces continuous with the discharge slot surfaces, and a plurality of spacing surfaces for spacing each pin element from adjacent pin elements. The method also includes juxtaposedly bonding the plurality of pin elements into an array to define an inlet face having a plurality of feed channels, and a discharge face having an array of intersecting honeycomb discharge slots, wherein the discharge slots extend from the feed channels, and wherein the feed channels communicate with the discharge slots so as to guide an extrudable material toward the discharge face.

Still another aspect of the present invention is to provide a method for constructing a honeycomb extrusion die including forming a plurality of first and second pin assemblies, each of which cooperate with one another to form the feed channels and discharge slots. In a preferred embodiment, each of the first and second pin assemblies comprise a plurality of pin elements disposed along a runner or connecting member. Such first and second pin assemblies can be formed, for example, via injection molding of each pin assembly so that the first and second pin assemblies include a plurality of first or second pin elements, respectively, and a runner. The pin elements, or pins, on each pin assembly include a plurality of discharge slot surfaces and a plurality of feed channel surfaces continuous with the discharge slot surfaces. At least one of the first or second pin elements on said pin assemblies have spacing surfaces thereon for appropriately spacing the first die elements from adjacent second die elements to form the feed channels and/or discharge slots. The method also includes bonding the plurality of pin elements from each pin assembly together such that the feed channel surfaces on each of the first and second die elements cooperate to define a plurality of feed channels, and the discharge slot surfaces on each of the first and second die elements define an array of intersecting honeycomb discharge slots, wherein the discharge slots extend from the feed channels, and the feed channels communicate with the discharge slots so as to guide an extrudable material toward the discharge face. After the pin elements of the first and second pin assemblies have been bonded together, the runners are removed, e.g. by grinding or cutting them away from the bonded pin elements. In this way, an extrusion die can be formed without the need for precision drilling or machining to form feed channels and/or discharge slots.

The present inventive method for constructing an extrusion die results in an extrusion die that exhibits a decreased relative degradation during the extrusion of abrasive materials, allows for high versatility in the kinds of materials that may be utilized to construct the die, reduces or eliminates the machining steps previously required to complete extrusion dies, and provides a greater flexibility to the design of the die, and as a result, to the design of the resultant honeycomb structure. The extrusion dies as disclosed herein, can be made to be more durable, allow for a reduction in manufacturing costs normally associated with producing extrusion dies, and are particularly well adapted for their proposed use.

These and other advantages of the invention will be further understood and appreciated by those skilled in the art by reference to the following written specification, claims and appended drawings.

DETAILED DESCRIPTION OF THE PREFERRED EMBODIMENTS

Figure 1:
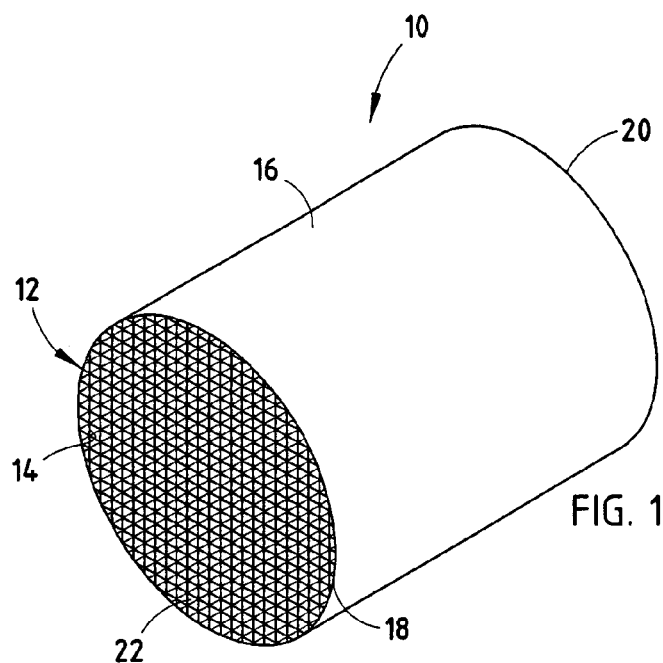
FIG. 1 is a perspective view of an extruded honeycomb body including a first end having a plurality of open-ended cells.
Figure 2:
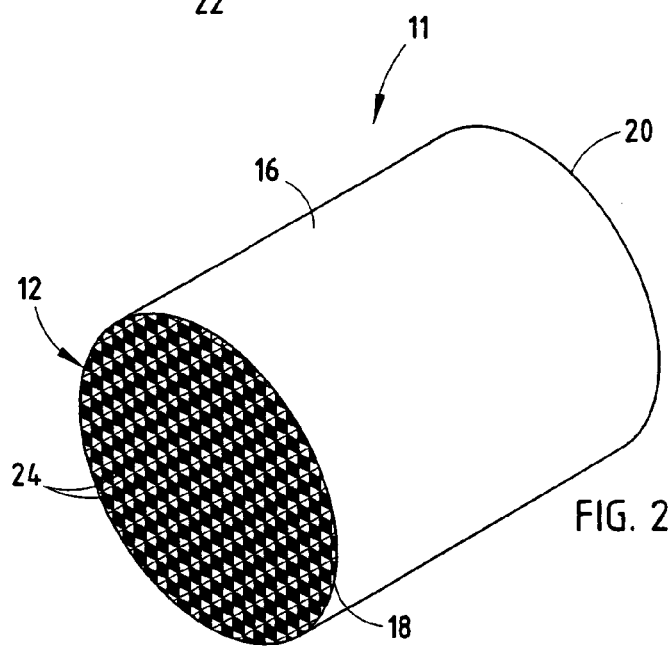
FIG. 2 is a perspective view of the honeycomb body, wherein a first subset of the cells are plugged, and a second subset of the cells are open-ended.
Figure 3:
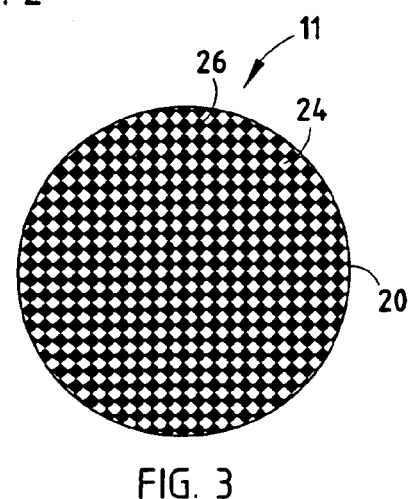
FIG. 3 is a side view of the filter body including a second end, wherein the first subset of the cells are open-ended and a second subset of the cells are plugged.
Figure 4:
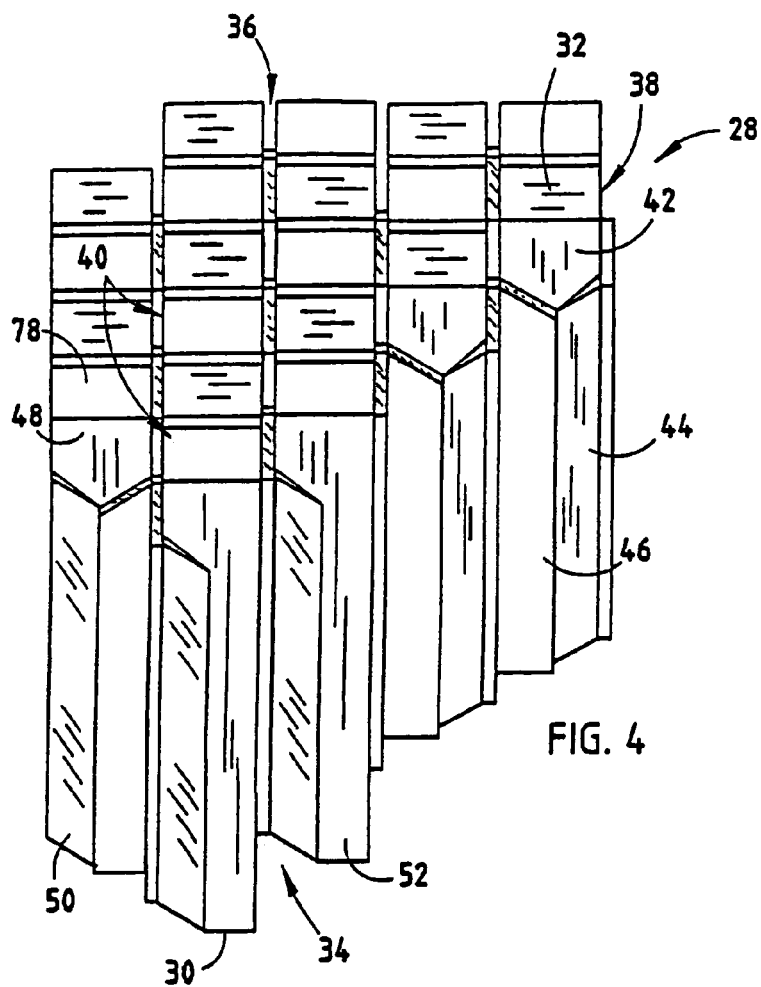
FIG. 4 is a fragmentary perspective view of an array of first and second pin elements cooperating to form an extrusion die embodying the present invention.
Figure 5:
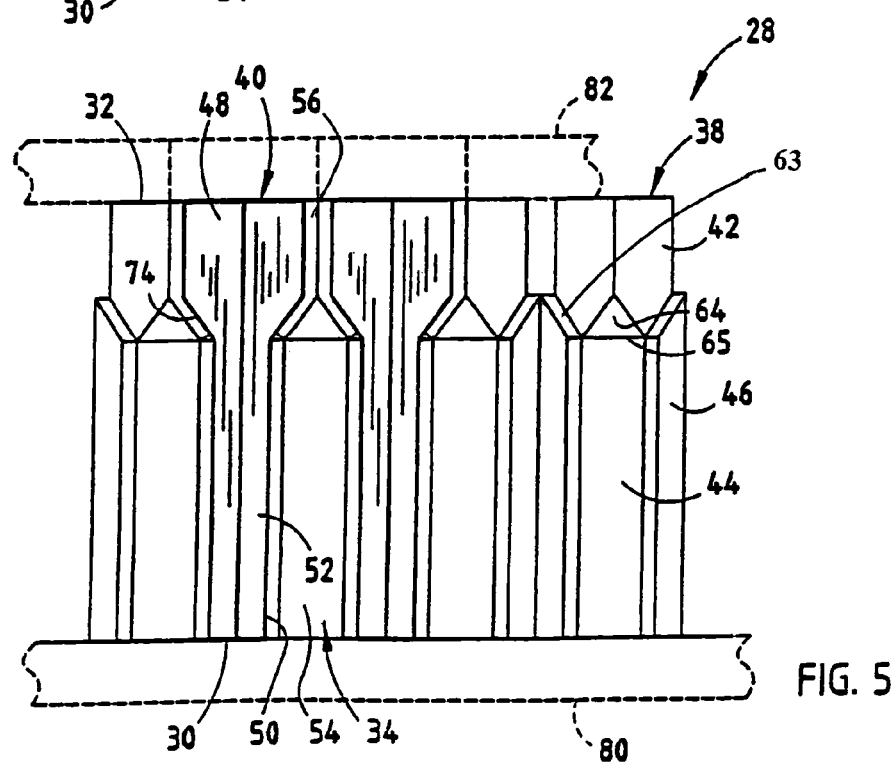
FIG. 5 is a side view of the array of the first and second pin elements of the extrusion die, extending between upper and lower runners as shown in dotted line.

For purposes of description herein, the terms "upper," "lower," "right," "left," "rear," "front," "vertical," "horizontal," and derivatives thereof shall relate to the invention as oriented in FIGS. 4 and 5. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 28 (FIGS. 4 and 5) generally designates an extrusion die embodying the present invention. In the illustrated example, the extrusion die includes an inlet face 30 and an outlet or discharge face 32 opposed across the die 28 from the inlet face 30. The inlet face includes a plurality of feed channels 34, and the discharge face 32 includes an array of intersecting honeycomb discharge slots 36. The extrusion die 28 further includes a bonded array of first pin elements 38 and second pin elements 40 exposed on the discharge face 32 of the die 28 and juxtaposed to form the discharge slots 36 and the array of feed channels 34. The discharge slots 36 extend from the feed channels 34, with the feed channels 34 communicating with the discharge slots 36 so as to guide an extrudable material (not shown) toward the discharge face 32. The first pin element 38 (FIG. 6B) includes a discharge slot surface 42, a pair of feed channel surfaces 44 continuous with the discharge slot surfaces 42 for guiding the extrudable material toward the discharge face 32, and a plurality of spacing surfaces 46 for spacing the first pin elements 38, from the second pin elements 40. Each second pin element 40 (FIG. 7B) includes discharge slot surfaces 48, feed channel surfaces 50 that are continuous with the discharge slot surfaces 48, and joining surfaces 52 which attach or join to spacing surface 46 of the first pin elements 38. The spacing surface 46 of first pin element 38 is raised or spaced appropriately so that when the first and second pin elements are combined, discharge surfaces 42 on pin element 38 and discharge surface 48 on pin element 40 are spaced from one another appropriately to form discharge slot 36.

As shown in FIGS. 4 and 5, the feed channels or holes 34 extend longitudinally through the extrusion die 28 and each include inlet portions or ends 54 corresponding to the inlet face 30. The discharge slots 36 extend longitudinally through the die 28 and include outlet portions or ends 56 corresponding to the discharge face 32. During the extrusion process, the inlet face 30 serves as the upstream face, while the discharge or outlet face 32 serves as the downstream face.

Figure 6A:
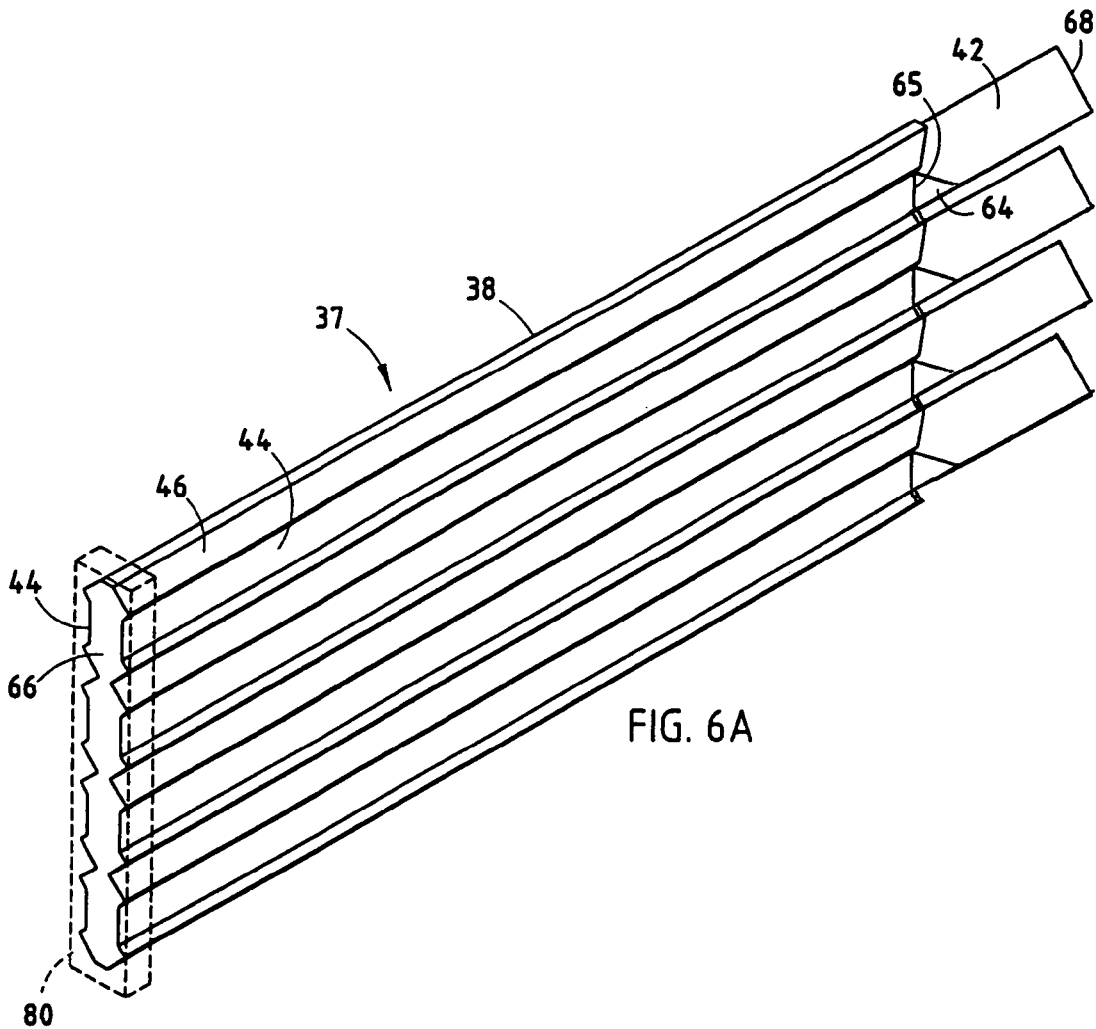
FIG. 6A is a perspective view of a first pin assembly of the extrusion die.
Figure 6B:
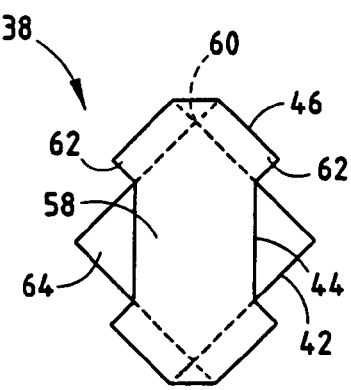
FIG. 6B is an end view of one of the first pin elements which are employed on the pin assembly illustrated in FIG. 6A.
Figure 7A:
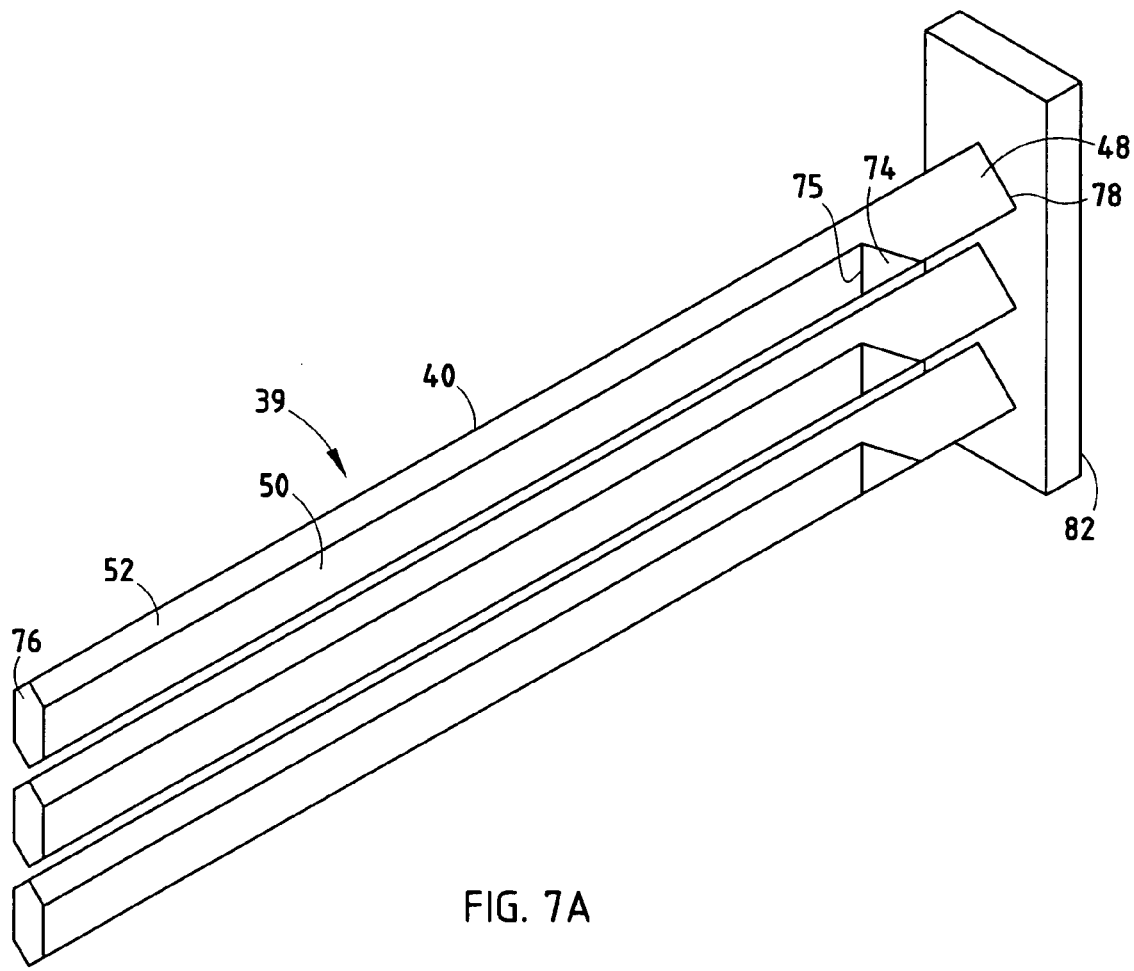
FIG. 7A is a perspective view of a second pin assembly of the extrusion die.
Figure 7B:
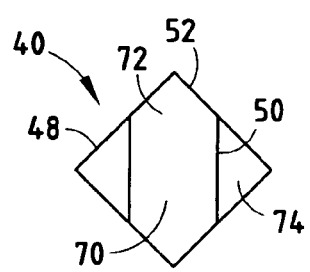
FIG. 7B is an end view of one of the second pin elements which are employed on the second pin assembly illustrated in FIG. 7A.

As shown in FIGS. 6A and 7A, in a preferred embodiment, first pin elements 38 are disposed along a runner 80 to form first pin assembly 37, and second pin elements 40 are disposed along a runner 82 to form second pin assembly 39. Each first pin element 38 (FIGS. 6A and 6B) includes a body portion 58 partially defined by feed channel surfaces 44 and spacing portions 60 opposed from one another across the body portion 58 and defined by spacing surfaces 46. In the illustrated example, each spacing portion 60 includes a pair of spacing surfaces 46 that cooperate to form spacer portion 62. The body portion 58 and the spacing portion 60 of each pin element 38 extends along a length of the pin element 38 toward the discharge slot surfaces 42. Each pin element 38 includes four discharge slot surfaces 42 that cooperate to form a substantially square shape. A transition surface 64 is preferably formed at an angle with respect to both a corresponding feed channel surface 44 and the discharge slot surfaces 42, thereby providing a gradual transition between the feed channel surface 44 and the discharge slot surfaces 42, and reducing the forces exerted on a transition point 65 located between the feed channel surfaces 44 and the discharge slot surfaces 42 of the pin element 38 during the extrusion process, and simultaneously reducing abrasive wear to the pin element 38 as caused by the extruded material. Similar to the transition surface 64 on discharge slot surfaces 42, the transition surface 63 is formed on spacer portion 62 at an angle with respect to both the corresponding feed channel surface 44 and the discharge slot surfaces 42 to thereby provide a gradual transition between the feed channel surface 44 and the discharge slot surface 42. Each pin element 38 further includes a first end 66, that forms a portion of the inlet face 30, and a second end 68 that forms a portion of the discharge face 32, upon assembly of the die 28.

Each second pin element 40 (FIGS. 7A and 7B) includes a substantially rectangular-shaped body portion 70 as partially defined by feed channel surfaces 50, and substantially triangularly-shaped end portions 72 opposed across the body portion 70 and defined by joining surfaces 52. In assembly, the end portions 72 of each second pin element 40 is adapted to be closely received by a pair of cooperating first pin elements 38, as described below. The body portion 70 and end portion 72 extend longitudinally along a length of the second pin element 40 toward the discharge slot surfaces 48. Each second pin element 40 is provided with four discharge slot surfaces 48 that cooperate to form a square-shaped structure. A transition surface 74 is formed at an angle with respect to both the associated feed channel surface 50 and the discharge slot surfaces 48, thereby providing a gradual transition between the feed channel surface 50 and the discharge slot surfaces 48 and reducing the stress exerted on a transition point 75 located between the feed channel surface 50 and the discharge slot surfaces 48 of the second pin element 40 during the extrusion process, and further reducing the abrasive effects caused by the extruded material. Each pin element 40 includes a first end 76 that forms a portion of the inlet face 30, and a second end 78 that forms a portion of the discharge face 32, upon construction of the die 28.

Figure 8:
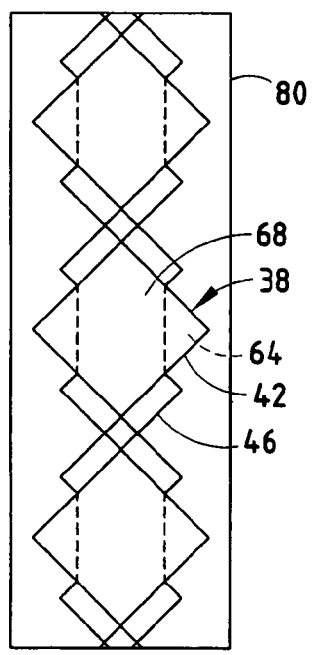
FIG. 8 is a top plan view of the first pin assembly illustrated in FIG. 6A.
Figure 9:
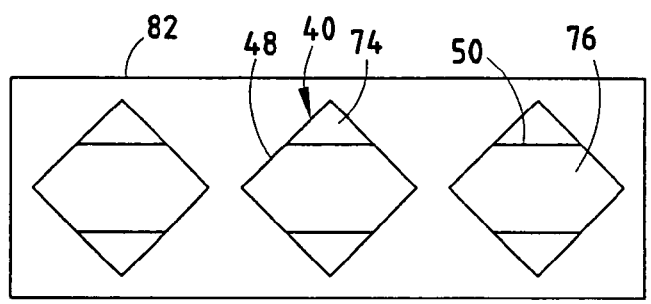
FIG. 9 is a bottom plan view of the second pin assembly illustrated in FIG. 7A.

In the illustrated example, the die 28 may be formed by injection molding the individual pin elements 38, 40 from a powdered metal. It should be noted that while injection molding the elements 38, 40 of a powdered metal is the preferred embodiment, other methods and materials known in the art may also be utilized. In a preferred embodiment, a plurality of pin assemblies 37, illustrated in FIGS. 6A and 8, and pin assemblies 39, illustrated in FIGS. 7A and 9, are formed via injection molding. As best illustrated in FIG. 5, the plurality of pin assemblies 37 and 39 are then combined and intersected with one another so that a plurality of parallel sets of runners 80 which contain the first pin elements 38 are orthogonal to a plurality of parallel sets of runners 82 which contain the second pin elements 40, thereby enabling the first pin elements 38 to align appropriately with respect to the second pin elements 40 and thereby form die 28. Of course, alternative methods could be employed to achieve the same result. For example, second pin elements 40 which are disposed on runner 80 (see FIG. 7A) could be rotated 90 degrees, in which case when assembling pin assemblies 37 and 39, the runners 80 and 82 would be assembled parallel to one another. The mated pin elements 38, 40 are then sintered, or cured together depending upon the material utilized to form the elements 38, 40, such that the first and second pin elements 38, 40 form a single, non-bifurcated extrusion die 28. Subsequent to the sintering step, the runners 80, 82 may be removed from the ends 66, 68, 76, 78 of the pin elements 38, 40 by grinding, cutting, milling, or the like, thereby forming inlet face 30 and discharge face 32. Although the illustrated example includes one method of using the runners 80, 82 for aligning the pin elements 38, 40, other steps and configurations may also be utilized. Alternatively, each pin element 38, 40 may be individually placed into position upon a single substrate prior to sintering.

Figure 10:
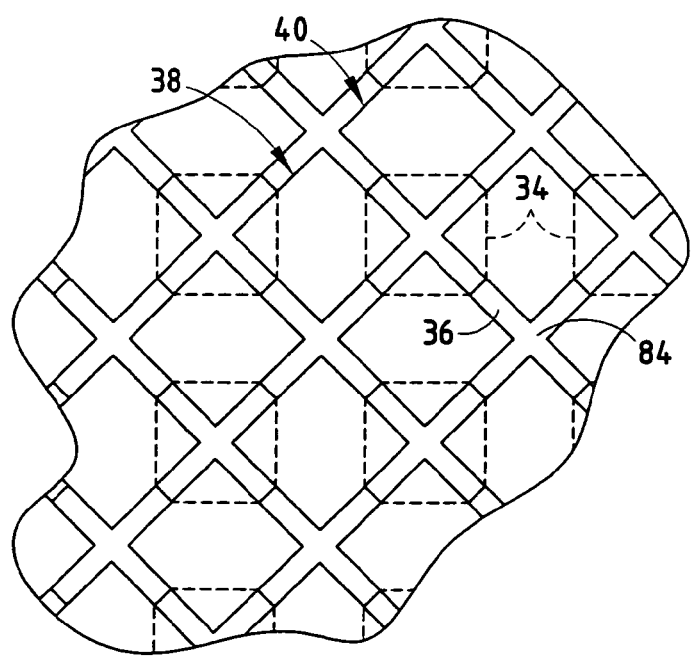
FIG. 10 is a fragmentary top plan view of the extrusion die made using the first and second pin assemblies illustrated in FIGS. 6A and 7A, with inlet apertures shown in dotted line.

As best illustrated in FIG. 10, pin elements 38, 40 of the present example are configured so as to provide a feed channel 34 corresponding to alternate intersections 84 of the discharge slots 36. However, it should be noted that other configurations for the pin elements 38, 40 may be utilized so as to provide feed channels at varying alignment with respect to the discharge slots 36 and the associated intersections 84 thereof.

The extrusion die as disclosed herein allows for high versatility in the kinds of materials that may be used to construct the die, reduces or eliminates the machining steps necessary to construct the die and specifically those normally associated with forming the extrusion slots and/or the feed channels, and provides a greater flexibility to the design of the die, and as a result, to the design of the resultant honeycomb structures as extruded therethrough. Moreover, the extrusion die as disclosed herein results in reduced manufacturing costs associated with producing extrusion dies, and is particularly well adapted for the proposed use.

Figure 11:
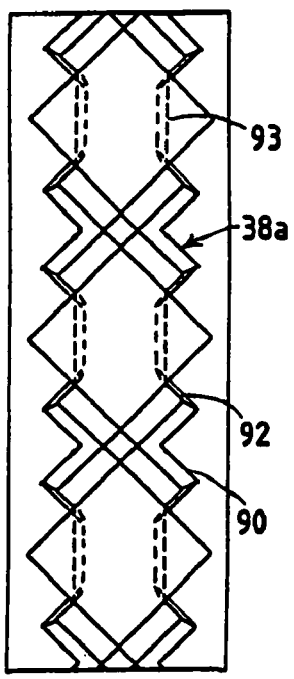
FIG. 11 is a top plan view of an alternative first pin assembly.
Figure 12:
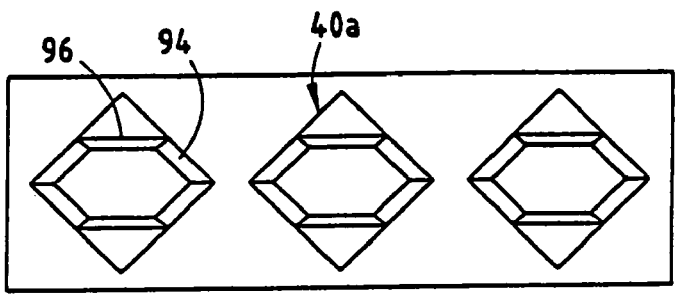
FIG. 12 is a bottom plan view of an alternative second pin assembly.

FIGS. 11 and 12 illustrate pin assemblies employing alternative first and second pin elements, respectively, which can be used to form an extrusion die 28 using the methods described above. Each of the first and second pin elements 38a and 40a include beveled surface regions which facilitate in movement of the extrudate material through the extrusion die 28. For example, while the first pin elements 38a (FIG. 11) include all of the surfaces of pin element 38 described above, pin element 38a additionally includes recessed or beveled surfaces 92, and 93 which will facilitate movement of the extrudate material from the discharge slots to the feed channels. Likewise, while the second pin elements 40a (FIG. 12) include all of the surfaces of pin element 40 described above, pin element 40a additionally includes recessed or beveled surfaces 96 which facilitate movement of the extrudate material from the discharge slots to the feed channels. Additionally, beveled surface 90 illustrated in FIG. 11 and beveled surface 94 illustrated in FIG. 12 aid in the assembly of the two parallel sets of pin assemblies. That is, beveled surface 94 will contact beveled surface 90 when the two pin assemblies are assembled together. In this example, feed channels 34 start at the feed end of the extrusion die as octagonal shape comprised of relatively equal length sides and transition gradually to a relatively square shape with rounded corners, as can be seen in phantom (34) in FIG. 10. Within the transition region, the cross sectional area of the feed channel preferably remains constant. As can be seen in FIG. 10, the smallest sides of the feed channel 34 preferably remain at least equal in size to the width of discharge slots 36.

Figure 13:
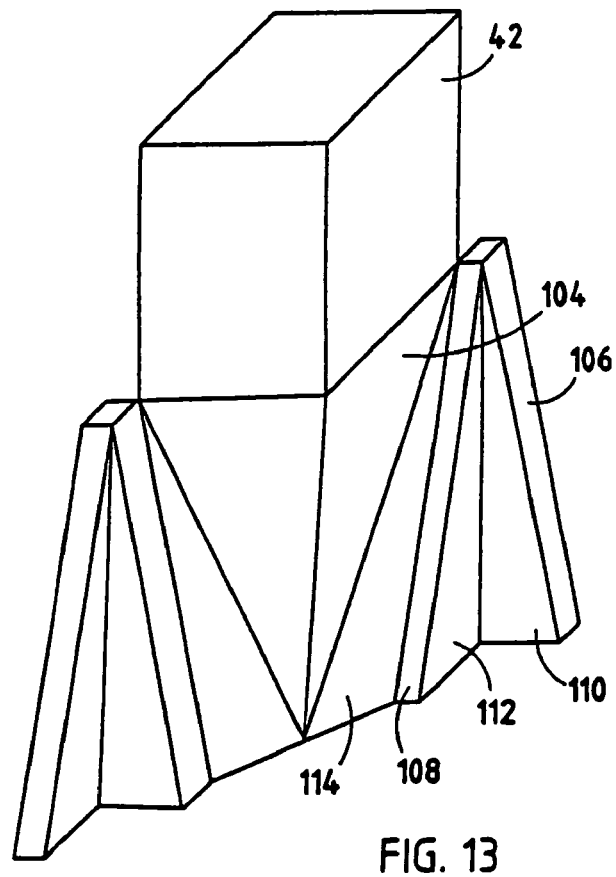
FIG. 13 is a perspective view illustrating another alternative first pin assembly.

FIG. 13 illustrates an alternative embodiment of first pin assembly employing first pin elements 38, wherein beveled regions 104, 110, 112, 114, 106 and 108 are also included to facilitate movement of extrudate material from the discharge slots to the feed channels.

In the foregoing description, it will be readily appreciated by those skilled in the art that modifications may be made to the invention without departing from the concepts disclosed therein. Such modifications are to be considered as including in the following claims, unless these claims by their language expressly state otherwise. For example, while the embodiments described above disclose assembling first and second pin arrays on runners which can then be assembled either in parallel or perpendicular arrangement with respect to one another, the invention is not limited to such designs, and alternative methods could be employed. For example, one of the first and second pin arrays could be arranged on a plate, so that a plurality of runners is not needed. Additionally or alternatively, one of the first and second pin arrays could be individually fed into cooperation with the pin elements attached to the plate (or runner, as the case may be), or a plurality of runners could be used for the second set of pin arrays to retain the pin elements in cooperating alignment with the pin arrays contained on the plate. Thereafter, the plates or runners could be removed after sintering of the pin elements has occurred.

The invention claimed is as follows:

1. A method for constructing a honeycomb extrusion die, comprising:
   integrally forming first and second pin arrays, the first pin array comprised of a plurality of first pin elements disposed along a first runner, and said second pin array comprising a plurality of second pin elements disposed along a second runner, each pin element including a plurality of discharge slot surfaces, a plurality of feed channel surfaces continuous with the discharge slot surfaces, and a plurality of spacing surfaces for spacing each pin element from adjacent pin elements; and
   bonding or fusing the first and second pin arrays to define an inlet face having a plurality of feed channels, and a discharge face having an array of intersecting discharge slots, wherein the discharge slots extend from the feed channels, and wherein the feed channels communicate with the discharge slots so as to guide an extrudable material toward the discharge face.

2. The method of claim 1, wherein the forming step includes forming the pin arrays from a powder formed metal.

3. The method of claim 1, wherein the first and second pin arrays are bonded or fused so that said first runner is orthogonal to said second runner.

4. The method of claim 3, wherein the bonding or fusing step includes sintering the first and second pin arrays.

5. The method of claim 1, wherein said first and second pin arrays are formed via injection molding.

6. The method of claim 1, wherein none of the discharge slot surfaces are machined prior or subsequent to bonding.

* * * * *